Patented Aug. 24, 1937

2,090,651

UNITED STATES PATENT OFFICE 2,090,651

PROCESS OF PREPARING N-MONOMETHYL-PARA-AMINOPHENOL AND ITS SULPHATE

Harold Von Bramer and Albert C. Ruggles, Kingsport, Tenn., assignors, by mesne assignments, to Eastman Kodak Company, Jersey City, N. J., a corporation of New Jersey No Drawing. Application November 10, 1933, Serial No. 697,527

17 Claims. (Cl. 260—128)

This invention relates to the production of N-monomethyl para-aminophenol, and to the preparation of its sulphate—known in the trade as "Metol".

The preparation of N-monomethyl-para-aminophenol has been known for approximately a half century and the use of it, or its sulphate, as a photographic developer has been known for at least three decades. Several methods for the preparation of N-monomethyl-para-aminophenol have been known. Two of the more prominent methods are—(1) the decomposition of glycine in a phenolic medium as described in MacLeester Patents Nos. 1,844,926 and 1,882,437 and Dickins Patent No. 1,844,844 and (2) the treatment of hydroquinone with methyl amine under heat and pressure as described in the Merck German Patent No. 260,234 of 1913 (reviewed by Ermen in the May 1923 Photographic Journal) later modified as described in Harger U. S. Patent No. 1,297,685 (reviewed by Harger in J. C. S. 41, 1919). As pertains to the prior art, the instant invention relates generically to the second mentioned process, but is a distinct advance thereover in many respects hereinafter pointed out.

One of the chief objections found to the Merck process, and even to the Harger process, is the unavoidable preparation in the process of tarry matter and of symmetrical dimethyl paraphenylenediamine which, as pointed out by Ermen, is the compound which causes the highly objectionable "Metol poisoning". In addition, the Merck process gives too low yields to be of commercial value.

We have discovered that if hydroquinone is first dissolved in a considerable quantity of water and aqueous methylamine is then added gradually to such solution under pressure at an elevated temperature, the production of tarry matter is avoided and the side reaction by which symmetrical dimethyl paraphenylenediamine is produced is substantially inhibited. It follows as a matter of course that we obtain very nearly theoretical yields which are very much in excess of any yields obtained by the Merck or Harger processes.

Accordingly, it is an object of our invention to provide a process for preparing mono-methyl para-aminophenol and its sulphate, from hydroquinone. It is a further object of our invention to provide such a process in which exceptionally good yields are, obtained and any production of symmetrical dimethyl paraphenylenediamine is substantially inhibited. Other objects will be amply apparent upon a further perusal of this specification.

As an example of our process, but by which we do not, of course, intend to be limited other than as defined by the claims appended hereto, N-monomethyl-para-aminophenol sulphate may be prepared in accordance with our process as follows: a solution of 11 pounds of hydroquinone and .1 lb. of sodium sulphite in 55 pounds of water (preferably purified) is introduced into an autoclave with constant stirring, and heated to a reaction temperature of from about 190 to 195° C. 12.5 pounds of 30% monomethylamine is then gradually introduced into the autoclave over a period of about eight hours (this introduction of the aqueous methylamine into the autoclave is, of course, under a pressure slightly in excess of that maintained in the autoclave). When all of the aqueous methylamine has been introduced into the autoclave, heating is continued at the reaction temperature for a period of some eight to ten hours longer.

The pressure in the autoclave is then released and the batch is neutralized by the addition of a suitable quantity of sulphuric acid (4.9 pounds in the instant case) preferably out of contact with air or oxygen, thus converting the N-monomethyl-para-aminophenol to its sulphate.

The resulting solution is cooled and the crude N-monomethyl-para-aminophenol sulphate crystals (produced due to cooling of the supersaturated reaction mixture thereof) are thoroughly washed with methanol to remove any possible traces of symmetrical dimethyl paraphenylenediamine. Upon a single recrystallization of such N-monomethyl-para-aminophenol sulphate crystals from a water-solution thereof, a product of excellent purity is obtained.

The mother liquor (from the reaction) may be concentrated in vacuo and the resulting metol sulphate crystals purified as above. The final mother liquor, containing some N-monomethyl-para-aminophenol, N-monomethyl-para-aminophenol sulphate, symmetrical dimethyl paraphenylenediamine, etc. and hydroquinone, may be utilized by introducing it into the process of preparing hydroquinone, wherein these compounds are reoxidized to quinone which is in turn converted to hydroquinone. Any monomethylamine sulphate formed during such reaction may be recovered by neutralizing with alkali.

Various modifications may, of course, be employed in carrying out our process. For instance, the reaction temperature to be employed is not a perfectly definite one; if the temperature is maintained at too low a point the reaction will be slow, if allowed to go to too high a point the preparation of tarry matter and related decomposition products and various side reactions, such as the preparation of symmetrical dimethyl paraphenylenediamine, may be encouraged. As a general proposition, we find a temperature range of from 150° to 225° C. as being possible and about 190° to 195° C. as being preferable. The pressures employed depend, of course, upon the temperature to which the reaction mixture is heated inasmuch as the pressures, as well known in the art, correspond directly (in a closed vessel) to the temperature to which the solution is heated; it is sufficiently instructive to those skilled in the art to state that we employ pressures corresponding to the temperatures of the reaction.

As above adverted to, the success of our process may be attributed to the fact that we dissolve the hydroquinone in a considerable volume of water and add the methylamine thereto very slowly while keeping it well agitated. By using a voluminous solution we avoid localized overheating and obtain a better distribution of the reaction constituents; we have also found that this seems to inhibit the formation of phenylene diamine and tarry matter. By adding the methylamine slowly and in aqueous solution we avoid undue localized reactivity and thus avoid the formation of tarry impurities. Obviously, the ratio of 5:1 (31:1 moles) water to hydroquinone, is not absolute as we may use 4 or even 3 parts (18 moles) of water as an approximate minimum or 6 to 7 (43 moles) parts of water as a maximum. Furthermore, the methylamine may be a stronger or weaker solution than 30% and may be added over a period of say 5 to 10 hours or even somewhat more or less, so long as a molecular equivalent quantity of the methylamine is added. One may, of course, add even less than a molecular equivalent of methylamine but it would be less economical, particularly as to recovery and purification. Suffice it to say, one of the important features of our discovery is that the hydroquinone is reacted upon in aqueous solution of considerable volume (somewhat more dilute than a saturated solution) and the methylamine is added slowly over a considerable period, such as several hours, while the whole is well agitated.

We employ concentrated sulphuric acid for the neutralization of the Metol base in order to avoid the necessity of evaporating unnecessary water or other diluent, although it will be quite apparent that aqueous sulphuric acid of various strengths may be similarly employed.

We have found that the use of small quantities of alkali sulphites, such as sodium sulphite, in the reaction mixture tends to prevent oxidation and greatly increases the reaction rate. While the use of such sulphites in our process are not necessary, they are highly advantageous. About 1% sulphite (based on the hydroquinone) is satisfactory.

The equipment which it is necessary to use in carrying out our process will be readily apparent to those skilled in the art, it being necessary merely to employ a suitable non-corrosive autoclave, such as a steel one capable of withstanding the pressures employed in carrying out the reaction. This, as well as accompanying pumps, etc., are all standard equipment with those skilled in the art.

What we claim as our invention and desire to be secured by Letters Patent of the United States is:

1. A process for preparing N-monomethyl-para-aminophenol which comprises reacting a molecular proportion of monomethylamine, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the monomethylamine being added to the hydroquinone solution gradually.

2. A process for preparing N-monomethyl-para-aminophenol which comprises reacting a molecular proportion of monomethylamine, at a temperature of from about 150° C. to about 225° C. and the corresponding pressure resulting from the use of such a temperature in a closed vessel, with a molecular proportion of hydroquinone dissolved in from about 18 to about 43 molecular proportions of water, the monomethylamine being added to the hydroquinone solution gradually.

3. A process for preparing N-monomethyl-para-aminophenol which comprises reacting a molecular proportion of monomethylamine, at a temperature of from about 150° C. to about 225° C. and the corresponding pressure resulting from the use of such a temperature in a closed vessel, with a molecular proportion of hydroquinone dissolved in about 31 molecular proportions of water, the monomethylamine being added to the hydroquinone solution gradually.

4. A process for preparing N-monomethyl-para-aminophenol which comprises reacting a molecular proportion of monomethylamine, at a temperature from about 190° C. to about 195° C. and the corresponding pressure resulting from the use of such a temperature in a closed vessel, with a molecular proportion of hydroquinone dissolved in water of a volume sufficient to form less than a saturated solution, the monomethylamine being added to the hydroquinone solution gradually.

5. A process for preparing N-monomethyl-para-aminophenol which comprises reacting a molecular proportion of aqueous monomethylamine, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the aqueous monomethylamine and the hydroquinone solution being brought into contact gradually.

6. A process for preparing N-monomethyl-para-aminophenol which comprises reacting a molecular proportion of aqueous monomethylamine, at a temperature of from about 150° C. to about 225° C. and the corresponding pressure resulting from the use of such a temperature in a closed vessel, with a molecular proportion of hydroquinone dissolved in from about 18 to about 43 molecular proportions of water, the aqueous monomethylamine and the hydroquinone solution being brought into contact gradually.

7. A process for preparing N-monomethyl-para-aminophenol which comprises reacting a molecular proportion of aqueous monomethylamine, at a temperature of from about 150° C. to about 225° C. and the corresponding pressure resulting from the use of such a temperature in a closed vessel, with a molecular proportion of hydroquinone dissolved in about 31 molecular proportions of water, the aqueous monomethylamine and the hydroquinone solution being brought into contact gradually.

8. A process for preparing N-monomethylpara-aminophenol which comprises reacting a molecular proportion of aqueous monomethylamine, at a temperature of from about 190° C. to about 195° C. and the corresponding pressure resulting from the use of such a temperature in a closed vessel, with a molecular proportion of hydroquinone dissolved in water of a volume sufficient to form less than a saturated solution, the aqueous monomethylamine and the hydroquinone solution being brought into contact gradually.

9. A process for preparing N-monomethyl-para-aminophenol which comprises reacting a molecular proportion of aqueous monomethylamine at a temperature of from about 190° C. to about 195° C. and the corresponding pressure resulting from the use of such a temperature in a closed vessel, with a molecular proportion of hydroquinone dissolved in from about 18 to about 43 molecular proportions of water, the aqueous monomethylamine and the hydroquinone solution being brought into contact gradually.

10. A process for preparing N-monomethyl-para-aminophenol which comprises reacting a molecular proportion of aqueous monomethylamine, at a temperature of from about 190° C. to about 195° C. and the corresponding pressure resulting from the use of such a temperature in a closed vessel, with a molecular proportion of hydroquinone dissolved in about 31 molecular proportions of water, the aqueous monomethylamine and the hydroquinone solution being brought into contact gradually.

11. A process for preparing N-monomethyl-para-aminophenol which comprises condensing a molecular proportion of monomethylamine in a 30% aqueous solution, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the monomethylamine solution and the hydroquinone solution being brought into contact gradually.

12. A process for preparing N-monomethyl-para-aminophenol which comprises condensing a molecular proportion of monomethylamine in a 30% aqueous solution, at a temperature of from about 150° C. to about 225° C. and the corresponding pressure resulting from the use of such a temperature in a closed vessel, with a molecular proportion of hydroquinone dissolved in about 31 molecular proportions of water, the monomethylamine solution and the hydroquinone solution being brought into contact gradually.

13. A process for preparing N-monomethyl-para-aminophenol which comprises reacting a molecular proportion of aqueous monomethylamine, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the aqueous monomethylamine being added to the hydroquinone solution gradually.

14. A process for preparing N-monomethyl-para-aminophenol which comprises reacting a molecular proportion of aqueous monomethylamine, at a temperature of from about 150° C. to about 225° C. and the corresponding pressure resulting from the use of such a temperature in a closed vessel, with a molecular proportion of hydroquinone dissolved in from about 18 to about 43 molecular proportions of water, the aqueous monomethylamine being added to the hydroquinone solution gradually.

15. A process for preparing N-monomethyl-para-aminophenol which comprises reacting, in the presence of an alkali metal sulphite, a molecular proportion of monomethylamine, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the monomethylamine being added to the hydroquinone solution gradually.

16. A process for preparing the sulphate of N-monomethyl-para-aminophenol which comprises reacting a molecular proportion of monomethylamine, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the monomethylamine being added to the hydroquinone solution gradually, and sulphating the N-monomethyl-para-aminophenol thus fromed by adding sulphuric acid to the reaction mixture.

17. A process for preparing the sulphate of N-monomethyl-para-aminophenol which comprises reacting a molecular proportion of monomethylamine, at a temperature of from about 150° C. to about 225° C. and the corresponding pressure resulting from the use of such a temperature in a closed vessel, with a molecular proportion of hydroquinone dissolved in water of a volume sufficient to form less than a saturated solution, the monomethylamine being added to the hydroquinone solution gradually, sulphating the N-monomethyl-para-aminophenol thus formed, separating the N-monomethyl-para-aminophenol sulphate and re-oxidizing impurities in the mother liquor.

HAROLD VON BRAMER.
ALBERT C. RUGGLES.